US006856646B2

(12) United States Patent
Carbone et al.

(10) Patent No.: US 6,856,646 B2
(45) Date of Patent: Feb. 15, 2005

(54) T-SPACED EQUALIZATION FOR 1XEV SYSTEMS

(75) Inventors: Nick Carbone, San Diego, CA (US); Thomas Kenney, San Diego, CA (US); Jean-Marie Tran, San Diego, CA (US)

(73) Assignee: Nokia Corporation, Irving, TX (US)

( * ) Notice: Subject to any disclaimer, the term of this patent is extended or adjusted under 35 U.S.C. 154(b) by 168 days.

(21) Appl. No.: 10/101,293

(22) Filed: Mar. 19, 2002

(65) Prior Publication Data

US 2003/0179812 A1 Sep. 25, 2003

(51) Int. Cl.$^7$ ................................................ H04B 1/707
(52) U.S. Cl. ....................... 375/143; 375/144; 375/148; 375/152
(58) Field of Search ............................... 375/142, 143, 375/144, 148, 150, 152, 232, 233, 234; 370/320, 335, 342, 441

(56) References Cited

U.S. PATENT DOCUMENTS

| | | | | |
|---|---|---|---|---|
| 5,729,526 A | * | 3/1998 | Yoshida | 370/206 |
| 6,339,612 B1 | * | 1/2002 | Stewart et al. | 375/140 |
| 6,545,990 B1 | * | 4/2003 | Amalfitano et al. | 370/335 |
| 6,570,918 B1 | * | 5/2003 | Rademacher | 375/232 |
| 2002/0018485 A1 | * | 2/2002 | Hondo | 370/441 |
| 2003/0053524 A1 | * | 3/2003 | Dent | 375/148 |
| 2003/0058929 A1 | * | 3/2003 | Cox et al. | 375/150 |

\* cited by examiner

*Primary Examiner*—Don N. Vo
(74) *Attorney, Agent, or Firm*—Tom Weber; Gary Savitt

(57) ABSTRACT

The present invention relates to systems and methods that facilitate compensating for intersymbol interference (e.g. due to non-nyquist filtering) in Code Division Multiple Access (CDMA) systems (e.g., IS 95 and IS2000 systems). The subject invention employs equalization filters (e.g., T-spaced equalizers) at fingers of a RAKE receiver. By effecting such equalization filtering at a downstream point in a receiving system, e.g., at the fingers of the RAKE receiver, the filters can be run so as to operate at lower rates as compared to conventional systems where filtering is effected upstream where time is not necessarily known thus requiring equalization filters to operate at significantly faster rates (e.g., 2× or 4× expected chip rate). Accordingly, as compared to conventional systems where the matching filters often are of substantial complexity (e.g., >80 taps) the present invention provides for less complex equalization filters thereby reducing overall system complexity and cost.

20 Claims, 5 Drawing Sheets

T-SPACED EQUALIZATION FOR 1XEV SYSTEMS

TECHNICAL FIELD

The present invention relates to a system and methodology for mitigating interchip interference in Code Division Multiple Access (CDMA) multi-channel communication systems, and in particular to CDMA wireless communication systems.

BACKGROUND OF THE INVENTION

Wireless communication systems become ever more important as they increase user mobility and connectivity. Wireless systems facilitate mobile communication and data exchange in most metropolitan areas. Increasing employment of such systems has resulted in communication traffic handling and power consumption becoming important issues relating thereto.

Code Division Multiple Access (CDMA) allows signals to overlap in both frequency and time. Thus, CDMA signals operate in the same frequency band. More particularly, a scrambling code (e.g., a long pseudo noise code sequence) is associated with each base station and permits the base stations to be distinguished from each other. An orthogonal code (OVSF? code) is allocated to each remote terminal such as for example a mobile station. The OVSF codes are orthogonal with respect to each other, which permits a remote terminal to be distinguished from another. Symbol spreading is accomplished by applying scrambling codes and orthogonal codes at rates higher than the symbol rate (e.g., the chip rate). In IS-95 related systems, pulse-shape filtering is applied to the chips in order to reduce signal interference outside the signal band. However, the pulse shape filters defined in IS-95 systems do not satisfy the Nyquist criterion. Consequently, some interchip interference occurs in IS-95 related systems. This ICI can degrade the bit error rate (BER), particularly in systems employing high order modulation.

Despite various advantages of CDMA, practical issues such as power control speed and inter-base station interference can limit CDMA system(s) effectiveness. A CDMA system depends very much on the ability to provide for accurate power control, but in a mobile environment a communication signal can fluctuate too fast for the system to manage effective control. Additionally, cellular environments are often characterized by unstable signal propagation, severe signal attenuation between communicating entities as well as co-channel interference by other radio sources. Moreover, many urban environments contain a significant number of reflectors (e.g., buildings), causing a signal to follow multiple paths from a transmitter to a receiver. Because separate parts of such a multipath signal can arrive with different phases that destructively interfere, multipath can result in unpredictable signal fading. In addition, in order to provide service to shadowed areas, radiated power is increased, thereby escalating interference between base stations and significantly degrading performance.

Many conventional CDMA systems are multiuser-interference limited, whereas Time Division Multiple Access (TDMA) and Frequency Division Multiple Access (FDMA) are primarily bandwidth limited. Consequently, in many practical implementations of CDMA, capacity is directly related to signal-to-interference (S/I) ratio, which is essentially a measure of multiuser interference, caused by other overlapping signals.

CDMA cellular and microcellular wireless systems often employ long spreading codes, e.g., sequences with period(s) much longer than data symbol duration, employ complex powerful convolution codes to mitigate effects of multiuser interference and rely on power control strategies to remedy the "near-far" problem. However, as the number of concurrent transmissions increases in a fixed bandwidth system, or as relative power levels of different user signals become disparate (near-far problems), a high performance penalty is observed. The sensitivity of such systems to the multiuser interference and to the near-far problem can substantially mitigate overall system capacity.

In view of the above, it becomes readily apparent that improved cost-effective systems and methodologies are needed for further increasing system capacity and maintaining reasonable S/I ratio so that signal decoding can be carried out efficiently and accurately.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods that facilitate mitigating inter-symbol interference in Code Division Multiple Access (CDMA) systems (e.g., IS 95 and IS2000 systems). The subject invention employs equalization filters (e.g., T-spaced equalizers) at fingers of a RAKE receiver. By effecting such equalization filtering at a downstream point in a receiving system, e.g., at the fingers of the RAKE receiver, the equalization filters can be operated so as to equalize at lower chip rates as compared to conventional systems where equalization is effected upstream, whereby the correct time epoch is not necessarily known thus requiring equalizers to operate at significantly faster rates (e.g., 2× or 4× expected chip rate). Accordingly, as compared to conventional systems wherein equalizers often are of substantial complexity (e.g., >80 taps) the present invention provides for employment of relatively less complex equalizers thereby leading to reducing overall system complexity and cost.

The equalization filters are operated at the chip rate so as to compensate for inter-chip interference (e.g., inter-symbol interference) associated for example with a pulse shaping filter and broadband approximation to a matched filter of a receiver. The equalization filter of the subject invention can also be employed to compensate for group delay distortions associated with an Rx filter chain. System complexity is mitigated as compared to conventional systems since the equalization filter (operating at the RAKE fingers) of the subject invention runs at or about the chip rate rather than a higher than the chip rate as in conventional systems.

In accordance with one particular aspect of the invention, the equalization filter of the subject invention is applied to RAKE fingers associated with data channels (e.g., data only (DO), data voice (DV)), wherein high-order modulation is employed. Such scheme mitigates equalization processing associated with other RAKE fingers wherein high-order modulation is not employed such as for example in connection with other voice or control channels. Timing can be obtained via employment of a finger operating on a control channel. By focusing application of the equalizer filter(s) to fingers employing high order modulation, the number of total filter taps employed in a receiver can be less than if equalizers were employed on all or most fingers.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

In the following description, for purposes of explanation, numerous examples are set forth in order to provide a thorough understanding of the present invention. It may be evident, however, that the present invention may be practiced in other examples not set forth in the following description. In other instances, structures and devices are shown in block diagram form in order to facilitate describing various aspects of the present invention.

Various components (e.g., systems, filters, receivers, equalizers, combiners, selectors, correlates, symbol processors . . . ) are described herein and it is to be appreciated that such components can be implemented in a variety of manners such as for example either as hardware, a combination of hardware and software, software, or software in execution. For example, a component can be, but is not limited to being, a process running on a processor, a processor, an object, an executable, a thread of execution, a program, and a computer. By way of illustration, both an application running on a computing system and the computing device can be a component. One or more components can reside within a process and/or thread of execution and a component may be localized on one computing system and/or distributed between two or more computing systems.

Figure 1:
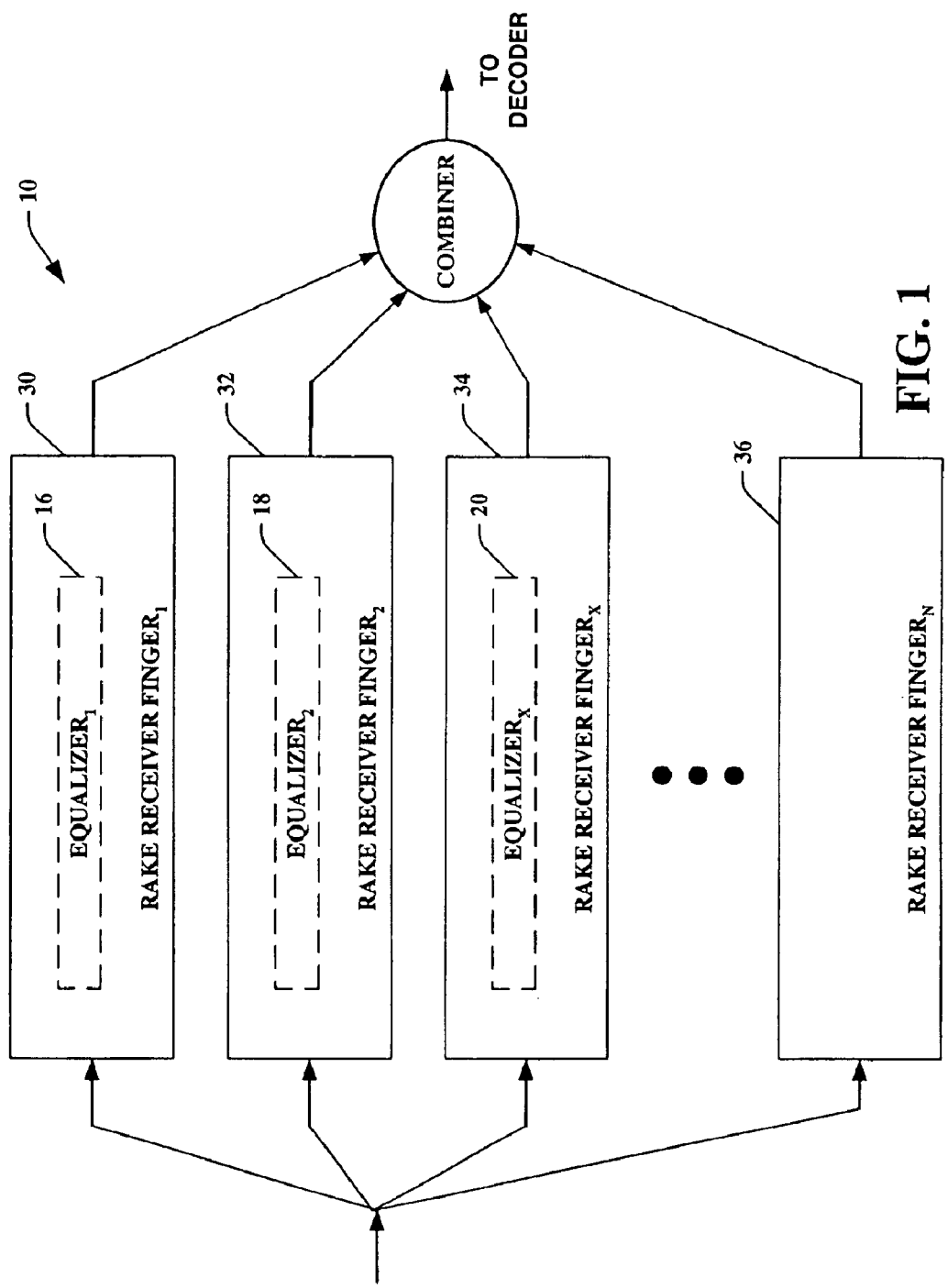
FIG. 1 is a schematic illustration of a portion of a receiver in accordance with the subject invention wherein equalizers are applied to RAKE fingers handling high-order modulation in accordance with the present invention.

FIG. 1 is a schematic illustration of a portion of a receiver system 10 in accordance with the subject invention wherein equalizers 16, 18 and 20 (EQUALIZERS$_1$–EQUALIZERS$_X$, where X is an integer) are applied to RAKE fingers 30, 32 and 34 ((RAKE FINGER$_1$–RAKE FINGER$_X$) handling high-order modulation in accordance with the present invention. Equalizers are not employed in connection with RAKE fingers ((RAKE FINGER$_{x+1}$–RAKE FINGER$_N$, where N is an integer) employing low-order modulation (e.g., in connection with voice or control channels). By such selective employment of equalizers in accordance with the subject invention, equalizer complexity (e.g., number of taps) can be reduced thus facilitating reduction of overall receiver complexity.

Figure 2:
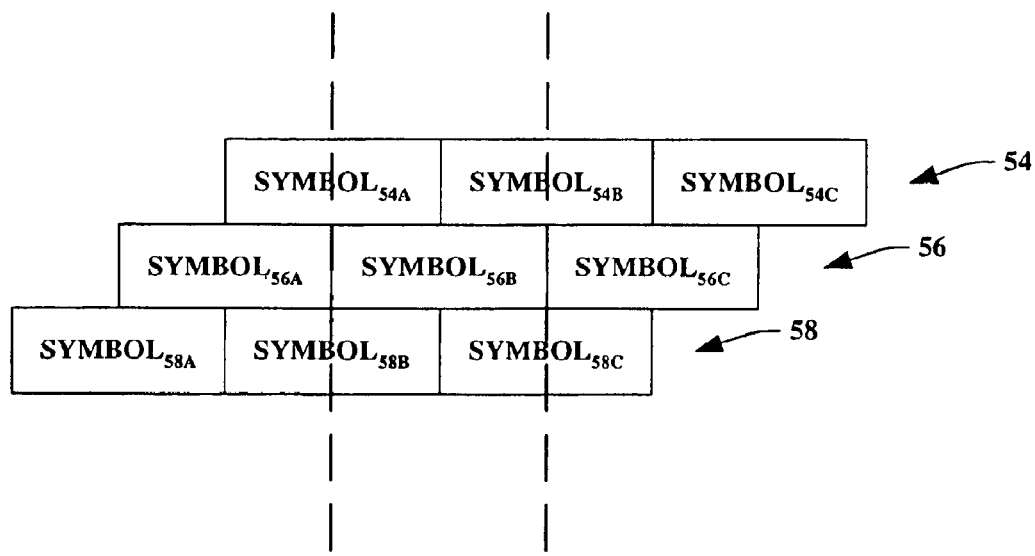
FIG. 2 illustrates an example for reception of asynchronous signals.

In order to provide some context for better appreciation of the novelties associated with the present invention, a brief discussion relating to RAKE receivers and wireless environments will be provided. FIG. 2 schematically illustrates a common situation where mobile units 54, 56, 58 are not synchronized with one another and are transmitting to a base station (not shown). Symbols obtained from the different units are received asynchronously. Symbols 54A–54C of unit 54, symbols 66A–56C of unit 56, and symbols 58A–58C of unit 58 arrive asynchronously such that different symbols partly overlap. As the base station receiver processes symbol 56B of unit 56, it regards symbols 54A, 54B, 58B and 58C of the other users as concurrent interference signals. The equalizer(s) 16, 18, 20 (FIG. 1) of the subject invention can be employed so as to mitigate the effects of multipath propagation. Moreover, adaptive systems can be employed to further mitigate intersymbol interference.

Prior to transmission via an antenna, an initial signal containing data (e.g., symbols) is scrambled and spread at the base station. Such scrambling and spreading is accomplished in part by employment of a scrambling code of the base station and an orthogonal code (OVSF) of a desired mobile unit. The symbols are transformed into chips having a predetermined length TC, and the chip rate is typically greater than the data or symbol rate (e.g., one symbol may be transformed into 4 to 256 chips). A pulse shaping filter filters the initial signal formed of chips prior to analog conversion and transmission through an antenna. The complex signal formed of two streams I and Q is over-sampled with an over-sampling factor Ns. This digital signal DSN includes delayed versions of the initial scrambled and spread signal transmitted by the base station—each path introduces a different time delay $\tau_1, \tau_2, \ldots \tau_K$ (wherein K is an integer).

In wideband communication systems, it is possible to improve communication quality via utilization of a RAKE receiver that effectively combines energy of multipath components. The RAKE receiver comprises a limited number of fingers that utilize a common chip-matched filter (CMF) to harness energy of each path. To exploit the energy in each path associated with a particular user, the path is first identified and acquired. Individual paths can be identified if they are resolvable. In CDMA systems, resolvable paths are those, which are mutually separated by delays greater than the chip period. Under this condition, the various delayed versions of the signal will almost mutually be uncorrelated. Code acquisition for respective paths can be accomplished via any of a number of well-known methodologies. The acquired path is then assigned to one of the RAKE fingers, which is typically equipped with a code-tracking unit. Thus, the signal of the tracked path is chip-matched filtered, its output then appropriately weighed, and the contributions of all fingers summed to form a bit decision statistic. Moreover, a search mechanism can be employed that searches and compares signal-to-noise (SNR) ratios obtained from the paths and assigns the strongest paths to the fingers.

More particularly, the RAKE receiver captures different timing arrivals of signals separately by exploiting correlation properties of a spreading code. In particular, if arrivals are separated in time by more than one chip duration, the different paths can be resolved. A circuit locking to or extracting a specific delay is referred to as the RAKE finger. Each finger despreads the signal and outputs of the respective fingers of the RAKE receiver are weighted and combined to cover a delay spread of a channel. The RAKE receiver typically employs a number of fingers (e.g., 3–6) to cover the delay spread of the channel. The respective weighting in each finger can be provided via coefficients of an finite impulse response (FIR) channel model, for example. The performance of the RAKE receiver is dependent in large part on the number of fingers which, in turn, is constrained by limits on power consumption and structural complexity. For example, a RAKE receiver employed in IS-95 systems typically has three fingers to acquire three paths. Consequently, in dense multipath environments where the signals arrive via many paths (e.g., heavily built-up urban areas), the RAKE receiver faces substantial performance degradation as the reception power is diversified to many paths and accordingly, the power captured by the limited number of RAKE fingers becomes small. As will be expounded upon in greater detail infra performance degradation intensifies as the chip rate increase in future-generation CDMA systems since more resolvable paths become available.

One particular aspect of the subject invention applies to IS-95 based systems deploying 1xEV-DO or 1xEV-DV. In 1xEV technologies, high-order modulation (e.g., 8-PSK, 16-QAM and 64-QAM) can be employed to achieve high data rates. IS-95 based systems comprise a pulse shaping filter that does not meet the Nyquist criterion (e.g., the pulse shaping filter is not designed so that zero interchip interference occurs at an optimal sampling epoch). Consequently, these systems are corrupted by interchip interference (ICI), also known as intersymbol interference. In IS-95, low order modulation was employed with large processing gains—therefore, the ICI resulted in nominal relative degradation of bit error rate (BER), which was acceptable. However, in high order modulation systems with lower processing gains, ICI can degrade a constellation so as to have a significant impact on BER leading to an unacceptable result. An equalization filter can be employed to correct for such ICI induced distortion.

Referring back to FIG. 1, the equalizers 16, 18, 20 are employed as part of the receiver system 10 in accordance with the subject invention. The equalizers are associated with respective RAKE fingers 30, 32, 34 of the receiver system 10 that preferably perform high-order modulation. The equalizers (e.g., Rx equalization filter) operates at the chip rate in order to facilitate correcting for ICI associated with the transmit IS-95 pulse shaping filter. The equalizer(s) can also be employed to facilitate correcting for group delay distortions associated with an Rx filter chain. As compared to many conventional receiver systems, complexity of a receiver in accordance with the subject invention is mitigated via operating the equalizer(s) at the chip rate rather than a higher rate. Accordingly, fewer filter taps are required in the equalizer(s) of the subject invention as a result of operating at the chip rate. By lower receiver complexity, costs savings can be achieved by the present invention.

Moreover, in accordance with a particular aspect of the invention, the equalizer(s) 16, 18, 20 can be selectively limited to application with fingers associated with data channels, wherein high-order modulation is employed. The illustrated system 10 of FIG. 1 includes a plurality of fingers (RAKE FINGER$_1$–RAKE FINGER$_N$) wherein "N" is an integer. The equalizers (EQUALIZER$_1$–EQUALIZER$_X$), where "X" is also an integer, are applied to RAKE fingers (RAKE FINGER$_1$–RAKE FINGER$_X$) that are associated with high-order modulation (e.g., data channels). The other RAKE Fingers (e.g, RAKE FINGER$_{X+1}$–RAKE FINGER$_N$) are associated with low order modulation (e.g., voice channels) and thus ICI degradation associated therewith is nominal relative to the processing gains and therefore designated equalizers are not applied thereto.

The equalizers of the subject invention operate at T-spacing (e.g., chip rate) thus affording for reduced equalizer complexity as compared to prior art systems, while providing like performance of more complex conventional receivers. The equalizers compensate for or suppress inter-chip (inter-symbol) and cross-symbol interference between transmitted pulses so as to facilitate recovering original transmitted data. The equalizers can employ for example a multiple-input, multiple-output, statistical approach such as maximum likelihood sequence estimation (MLSE) to extract originally transmitted data from a received modulated signal (e.g., comprising two or more interfering pulses one or more quadrature components). It is appreciated that equalization could be employed upstream/input in conjunction with a matched filter for example, however, at such point in the receiver the sampling rate is typically significantly higher at least in part due to higher sampling rates associated with fractional spacing. Many equalizer proposals operate with fractional spacing—this is typically necessary because T-spaced equalizers can result in spectral aliasing when time is not perfect. Fractional spacing can require numerous filter taps (e.g., typically 2× or 4×), which can require numerous gates or million instructions per second (MIPS) in implementation. However, in accordance with the subject invention, a priori timing recovery mitigates timing errors. Consequently, fractional spacing is not generally necessary and the number of required taps for the equalization filters can be significantly less than equalizers of conventional receivers.

Figure 3:
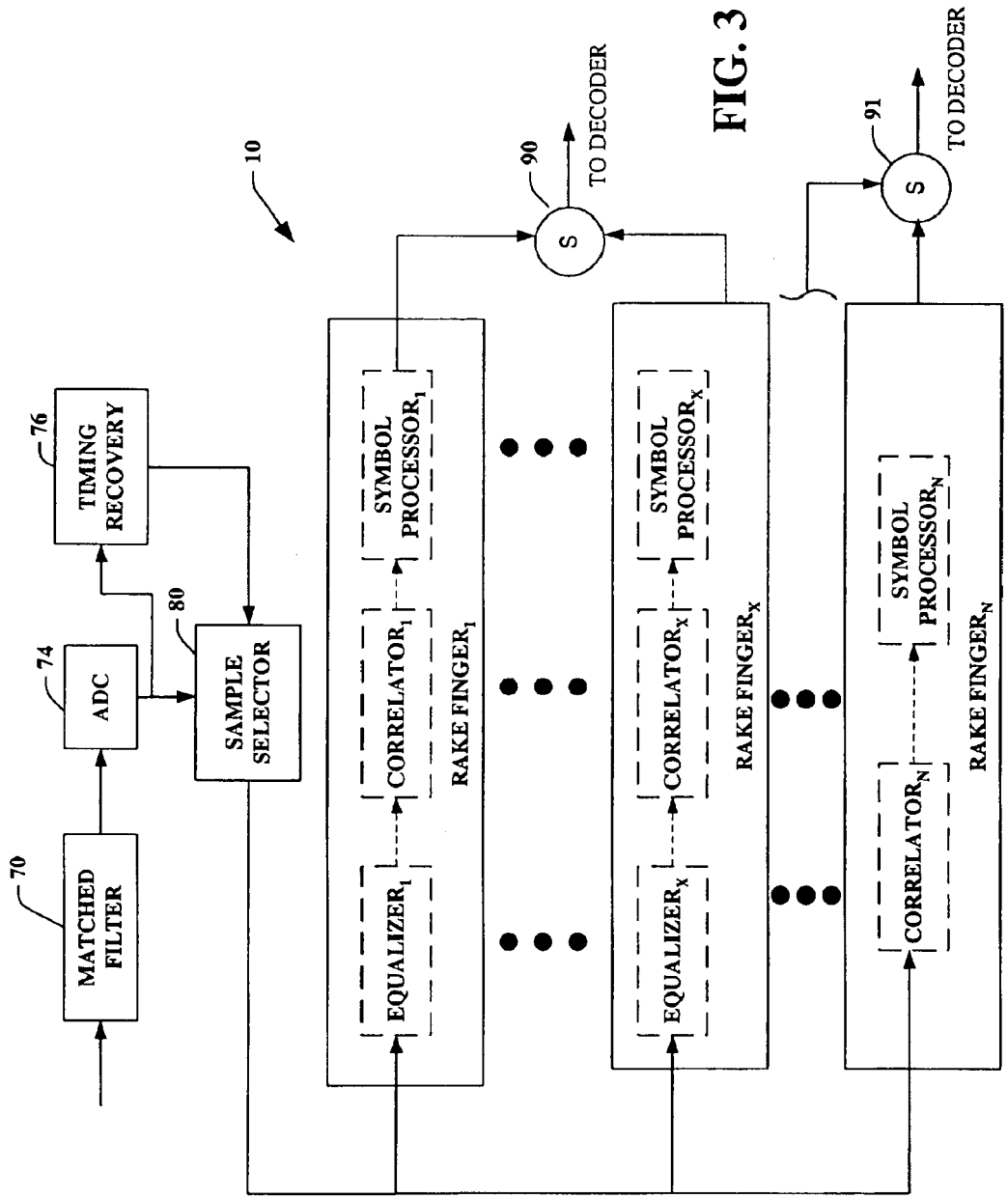
FIG. 3 is a schematic illustration of a portion of a receiver system in accordance with the present invention.

Turning now to FIG. 3, a more detailed illustration of the RAKE receiver 10 in accordance with the subject invention is provided. The RAKE receiver 10 received an output of a matched filter 70. The matched filter 70 typically is of complex type and can require numerous taps (e.g., 128 taps), however, it is to be appreciated that the number of taps can be changed as needed. The matched filter samples quadrature-detected received signals $R_I$ and $R_Q$ at a clock frequency that is higher than the chip rate and calculates by analog operations a correlation between these signals ($R_I$ and $R_Q$) and a replica of prescribed spread codes (long code PN and short code PN). The effective tap number (number of taps) of the matched filter can be changed in accordance with the spread factor.

The matched filter 70 filters and outputs received data. It is to be appreciated that the match filtering can occur before or after analog to digital (A/D) conversion. The signal is passed through an analog to digital converter (ADC) 74 where the signal is quantized. After quantization, the signal is down-sampled via a timing recovery block 76. Timing recovery can occur in a variety of manners, but most commonly through finger processing. A sample selector 80 samples the output of the matched filter at a predetermined symbol rate. Following timing recovery and sampling, the T-spaced equalization filtering occurs at the down-sampled rate (e.g., chip rate). Timing recovery is obtained for a control channel, and thus timing recovery obtained from finger processing for the control channel can be applied to data channel(s), which employ high order modulation. Employing such timing recovery, the data channel can be down-sampled to a rate of 1 sample/chip. The down-sampled data can then be equalized using a T-spaced filter that operates at 1 sample/chip.

As shown (and discussed supra in connection with FIG. 1), the receiver 10 includes a plurality of fingers (RAKE FINGER$_1$–RAKE FINGER$_N$) wherein "N" is an integer. The equalizers (EQUALIZER$_1$–EQUALIZER$_X$), where "X" is also an integer, are applied to RAKE fingers (RAKE FINGER$_1$–RAKE FINGER$_X$) that are associated with high-order modulation (e.g., data channels). The other RAKE Fingers (e.g, RAKE FINGER$_{X+1}$–RAKE FINGER$_N$) are associated with low order modulation (e.g., voice channels) and thus ICI degradation associated therewith is nominal relative to the processing gains and therefore designated equalizers are not applied thereto. Accordingly, the equalizers (EQUALIZER$_1$–EQUALIZER$_X$) can be operated at a lower rate (e.g., one sample/chip) and thus can be less complex as compared to equalizer counterparts of conventional receiver systems.

The equalized signal is then followed by correlation and symbol processing. A combiner 90 combines the symbol sequences arriving from the respective RAKE finger elements by taking into account and compensating, for example, their different delays $\tau_K$ and possibly by weighting the different symbol sequences according to their signal-to-noise ratios in order to obtain maximum ratio combination. The combined symbol sequence thus obtained is supplied to a decoder (not shown) which decodes the symbols to user data bits, usually performing deinterleaving first. CDMA applications generally employ strong convolution coding for which an effective method of detection is the Viterbi algorithm providing a soft decision. It is to be appreciated that in accordance with one particular aspect of the invention the combiner 90 is associated with high order modulation RAKE fingers, and another combiner 91 is associated with low order modulation RAKE fingers.

Figure 4:
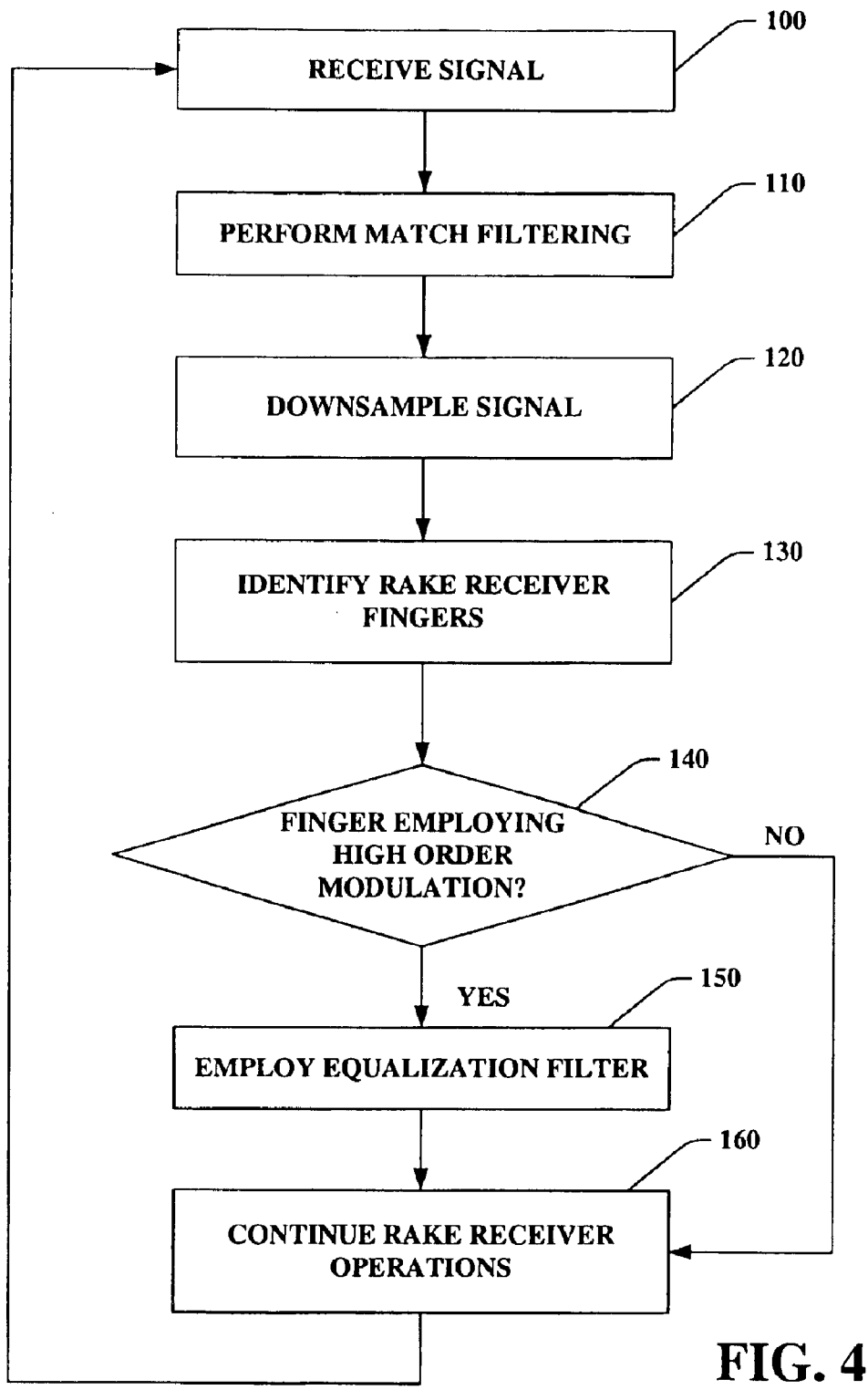
FIG. 4 is a high-level flow diagram illustrating a methodology for employment of equalization filters in accordance with the present invention.

In view of the exemplary systems shown and described above, methodologies that may be implemented in accordance with the present invention will be better appreciated with reference to the flow diagram of FIG. 4. While, for purposes of simplicity of explanation, the methodologies are shown and described as a series of acts, it is to be understood and appreciated that the present invention is not limited by the order of the acts, as some acts can, in accordance with the present invention, occur in different orders and/or concurrently with other acts from that shown and described herein. Moreover, not all illustrated acts may be required to implement a methodology in accordance with the present invention.

FIG. 4 illustrates a high level methodology for carrying out an aspect of the subject invention. At 100 a signal is received, and matched filtering is employed at 110 After matched filtering, the signal is down-sampled at 120. At 130, RAKE fingers are identified for handling particular signals, respectively. At 140, a determination is made as to whether or not a RAKE finger is employing high order modulation (e.g., in connection with data channels (DO), (DV)). If no, RAKE receiver operations are continued at 160. If yes, the process proceeds to 150 where equalization is employed. As noted above, since the signal can be down-sampled, for example, to 1 sample/chip, thus the down-sampled data can be equalized at 1 sample/chip. Such lower chip rate affords for employing an equalizer with less taps thus lowering overall receiver complexity. Moreover, equalization can be limited to fingers employing high-order modulation (e.g., fingers handling data channels) thereby further limiting the number of equalization filters as well as filter taps employed.

Figure 5:
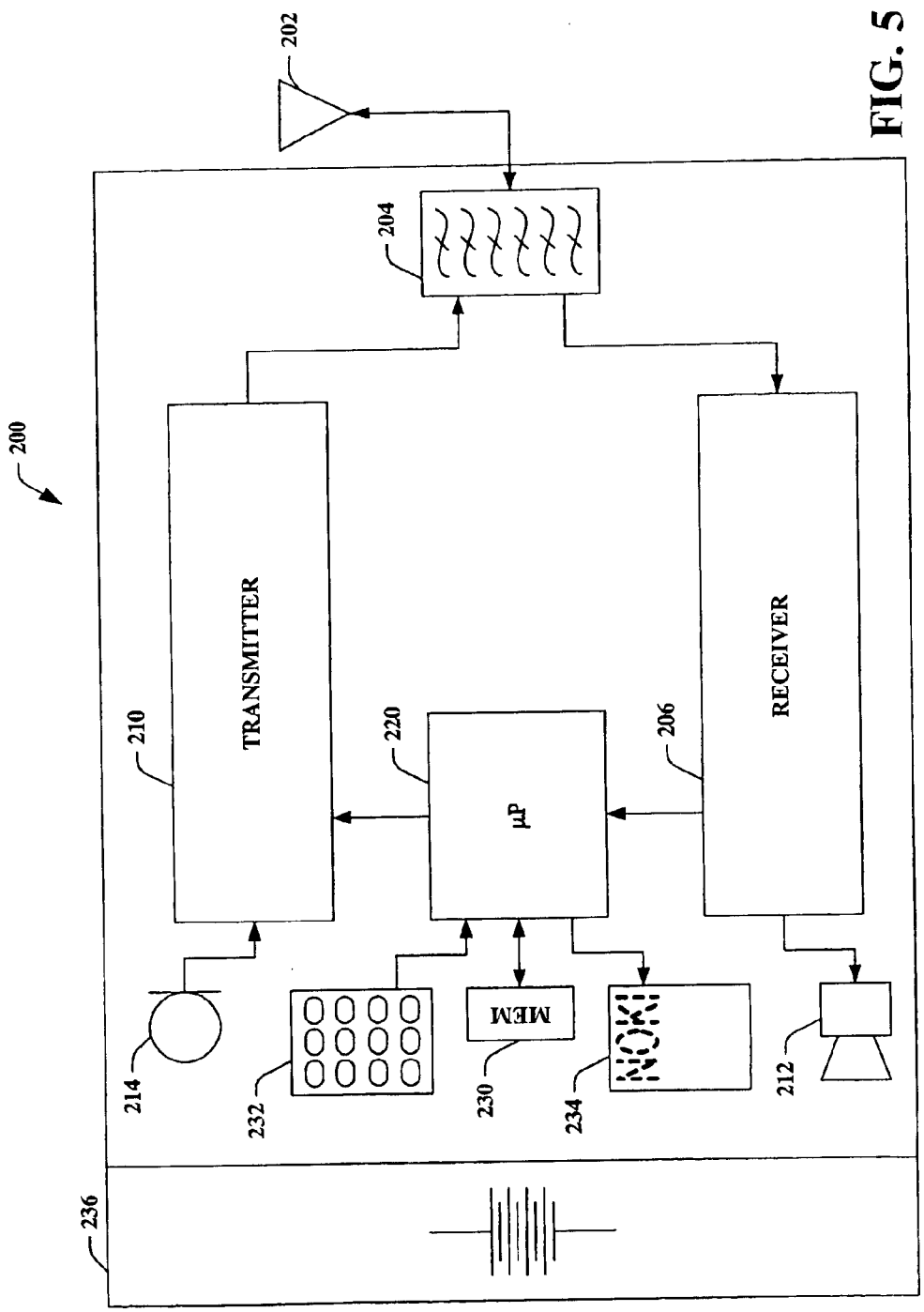
FIG. 5 is a schematic illustration of an exemplary communication device in accordance with the present invention.

FIG. 5 illustrates an exemplary wireless communications device 200 (e.g., mobile station, base station) which can be employed as a wireless communications system in accordance with the subject invention. The illustrated communications device 200 comprises an antenna 202 and a connected duplex filter 204, where a reception-frequency signal received by the antenna 202 is directed to a receiver 206, and the signal from a transmitter 210 is directed to the antenna 202. The receiver 206 provides reception, downmixing, demodulation and decoding functions by which a received radio-frequency signal is converted to an analog audio signal, which is then directed to a speaker 212, and to data signals which are directed to a processor 220. The transmitter 210 comprises usual coding, interleaving, modulation and upmixing functions whereby the analog audio signal produced by the microphone 214 and the data signals received by the processor 220 are converted to a transmittable radio-frequency signal. In addition, the communication device 200 comprises a memory 230, a keyboard 232, a display 234 and a power source 236. The receiver as described herein provides for mitigating of ICI especially with respect to high-order modulation application. The processor 220 executes necessary algorithms and also in other ways controls operation of the communications device 200, at least in part under directions of program(s) recorded in the memory 230, and commands input via a user and system commands (e.g., transmitted via a base station).

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A RAKE receiver, comprising:
    a system that receives and down-samples a signal to produce a down-sampled signal;
    a plurality of RAKE fingers that despread the down-sampled signal respectively, the plurality of RAKE fingers comprising at least one RAKE finger handling channels performing low order modulation and a subset of the plurality of RAKE fingers handling channels performing high-order modulation; and
    an equalizer associated with each RAKE finger of the subset, the equalizer operating at a chip rate, and facilitating compensating for interchip interface.

2. The RAKE receiver of claim 1, at the least one finger of the subset being associated with a data channel.

3. The RAKE receiver of claim 2, the data channel being a data only (DO) channel.

4. The RAKE receiver of claim 2, the data channel being a data and voice (DV) channel.

5. The RAKE receiver of claim 1, the equalizer comprising a finite impulse response filter (FIR).

6. The RAKE receiver of claim 5, the equalizer further comprising an infinite impulse response filter (IIR).

7. The RAKE receiver of claim 1, the equalizer being adaptive or non-adaptive.

8. The RAKE receiver of claim 1 being employed in connection with a mobile station in a wireless communications system.

9. The RAKE receiver of claim 1 being employed in connection with a base station in a wireless communications system.

10. The RAKE receiver of claim 1, the down-sampling being effected by a timing recovery system that employs timing recovery for a control channel and applies such timing recovery to data channels that employ high-order modulation.

11. A method that facilitates mitigating of intersymbol interference, comprising:
- performing match filtering of a receiving signal to produce a match-filtered signal;
- down-sampling the match-filtered signal;
- applying the match-filtered signal to a plurality of of fingers of a RAKE receiver; and
- employing equalization in connection with a subset of fingers of the RAKE receiver, wherein the RAKE receiver employs at least one RAKE finger performing lower-order modulation and the subset of fingers performing high-order modulation.

12. The method of claim 11, the equalization being performed at a chip rate.

13. The method of claim 11, the down-sampling being performed at 1 sample/chip.

14. The method of claim 11, the equalization being effected via employment of a T-spaced filter.

15. The method of claim 11, the equalization being employed only on RAKE fingers handling data channels.

16. The method of claim 15, the data channels comprising data only (DO) channels and data and voice (DV) channels.

17. A system that facilitates mitigating interchip interference, comprising:
- means for receiving a signal;
- means for processing the signal according to a RAKE receiver, wherein the RAKE receiver comprises a plurality of RAKE fingers having at least one RAKE finger for processing low-order, modulation channels and a subset of RAKE fingers for processing high-order modulation channels; and
- means for equalizing at a chip rate a subset of the received signal, the means for equalizing being applied in connection with the subset of RAKE fingers for processing high-order modulation channels.

18. A system that facilitates compensating for interchip interference, comprising:
- a matched filter that samples quadrature received signals at a clock frequency greater than a chip rate to produce a matched-filter signal, and calculates a correlation between the matched-filter signals at a replica of prescribed spread codes;
- an analog to digital converter that quantizes the matched-filter signal to produce a quantized signal;
- a timing recovery system that down-samples the quantized signal;
- a sampler that samples the matched-filter signal at a predetermined symbol rate;
- a RAKE receiver, connected to the output of the sampler, comprising a plurality of RAKE fingers, wherein the plurality of RAKE fingers comprises at least one RAKE finger handling channels employing low-order modulation and a subset of RAKE fingers handling channels employing high-order modulation; and
- a T-spaced equalizer associated with at least one finger of the subset of fingers of the RAKE receiver, the T-spaced equalizer operating at about the chip rate.

19. A wireless communication device for a wireless communication system, the wireless communication device comprising:
- a RAKE receiver; said RAKE receiver comprising a system that receives and down-samples a signal to produce a down-sampled signal; a plurality of RAKE fingers that despread the down-sampled signal respectively, the plurality of RAKE fingers comprise, at least one RAKE finger performing low-order modulation and a subset of the plurality of RAKE fingers performing high-order modulation; and
- said RAKE receiver further comprising an equalizer associated with each RAKE finger of the subset, said equalizer operating at a chip rate, and facilitating compensation for interchip interference.

20. The wireless communication device of claim 19, wherein said down-sampling being effected by a timing recovery system that employs timing recovery for a control channel and applies such timing recovery to data channels that employ high-order modulation.

* * * * *